United States Patent [19]
Ziolek et al.

[11] Patent Number: 5,582,138
[45] Date of Patent: Dec. 10, 1996

[54] ELECTRONICALLY CONTROLLED ENGINE COOLING APPARATUS

[75] Inventors: Leszek Ziolek, Nashua, N.H.; David J. Nenno, Eliot, Me.; Wayne R. Duprez, Waltham, Mass.

[73] Assignee: Standard-Thomson Corporation, Waltham, Mass.

[21] Appl. No.: 405,970

[22] Filed: Mar. 17, 1995

[51] Int. Cl.$^6$ .................................................... F01P 7/16
[52] U.S. Cl. ............................................................ 123/41.1
[58] Field of Search ............................ 123/41.1, 41.08, 123/41.09

[56] References Cited

U.S. PATENT DOCUMENTS

| | | |
|---|---|---|
| 4,590,563 | 5/1986 | Matsumura et al. . |
| 4,601,264 | 7/1986 | Hirano . |
| 4,616,599 | 10/1986 | Taguchi et al. ......................... 123/41.1 |
| 4,616,602 | 10/1986 | Hirano et al. . |
| 4,622,925 | 11/1986 | Kubozuka . |
| 4,624,221 | 11/1986 | Fujigaya et al. . |
| 4,627,397 | 12/1986 | Hayashi . |
| 4,630,573 | 12/1986 | Ogawa et al. . |
| 4,630,574 | 12/1986 | Hirano . |
| 4,632,069 | 12/1986 | Aoki et al. . |
| 4,633,822 | 1/1987 | Hayashi . |
| 4,646,688 | 3/1987 | Hirano et al. . |
| 4,648,357 | 3/1987 | Hayashi . |
| 4,649,869 | 3/1987 | Hayashi et al. . |
| 4,658,765 | 4/1987 | Hayashi . |
| 4,658,766 | 4/1987 | Hirano . |
| 4,662,316 | 5/1987 | Kubozuka . |
| 4,662,317 | 5/1987 | Ogawa . |
| 4,662,318 | 5/1987 | Hayashi . |
| 4,664,073 | 5/1987 | Hirano . |
| 4,667,626 | 5/1987 | Hayashi et al. . |
| 4,669,426 | 6/1987 | Hirano et al. . |
| 4,669,427 | 6/1987 | Shimonosono et al. . |
| 4,677,942 | 7/1987 | Hayashi . |
| 4,686,942 | 8/1987 | Hayashi et al. . |
| 4,694,784 | 9/1987 | Hirano et al. . |
| 4,721,071 | 1/1988 | Fujigaya et al. . |
| 4,766,852 | 8/1988 | Hirano et al. . |
| 4,788,943 | 12/1988 | Hayashi . |
| 4,875,437 | 10/1989 | Cook et al. ............................ 123/41.1 |
| 5,174,254 | 12/1992 | Humburg . |

FOREIGN PATENT DOCUMENTS

| | | | |
|---|---|---|---|
| 3018682 | 11/1980 | Germany ................................ | 123/41.1 |

*Primary Examiner*—Noah P. Kamen
*Attorney, Agent, or Firm*—Barnes & Thornburg

[57] ABSTRACT

An apparatus is provided for controlling the temperature of an engine based on a temperature control signal generated by an electronic control module of the engine. The electronic control module is coupled to a plurality of sensors configured to detect a plurality of engine component parameters and is configured to generate the temperature control signal related to an optimum engine temperature calculated using at least one output signal from at least one of the plurality of sensors. The apparatus includes a controller coupled to the electronic control module and to an engine temperature sensor. The controller generates an output signal based on the temperature control signal received from the electronic control module and on a signal proportional to the actual engine temperature received from the engine temperature sensor. The apparatus also includes an electronically actuated thermostat including a valve located within a coolant flow passageway of the engine and a motor electrically coupled to the controller. The motor is configured to open and close the valve to control flow of a coolant fluid in the coolant flow passageway in response to the output signal from the controller.

19 Claims, 3 Drawing Sheets

ELECTRONICALLY CONTROLLED ENGINE COOLING APPARATUS

BACKGROUND AND SUMMARY OF THE INVENTION

The present invention relates to an improved cooling system for an internal combustion engine. More particularly, the present invention relates to an electronically controlled cooling apparatus which uses an electronically controlled valve to control coolant flow between the engine and a radiator, thereby maintaining the engine temperature at substantially an optimum temperature.

Operation of most of a vehicle's engine components is presently controlled by an on board computer known as an engine control module (ECM). Engine components such as electrical, fuel, air, exhaust, and other mechanical components are all equipped with sensors which supply the ECM with electrical signals. These electrical signals provide the ECM with information related to the engine components. Based on these signals received from the plurality of the sensors, the ECM makes decisions regarding the operation of the engine and provides control signals to operate the engine components. The ECM, the plurality of sensors, and the engine components therefor create a closed loop feedback system for controlling engine operation.

Conventional thermostats for controlling coolant fluid flow from the engine to a radiator to cool the coolant fluid and the engine use a wax motor which opens and closes a valve of the thermostat. Such conventional thermostats are passive devices. In other words, the wax inside the motor melts and expands as the engine coolant temperature rises above a predetermined level. This expansion of the wax causes movement of a piston which, in turn, opens a valve to permit coolant flow to the radiator.

The apparatus of the present invention advantageously provides an active engine temperature control apparatus. The thermostat is controlled by the ECM and/or other electronic controller. The ECM processes inputs from the plurality of sensors and calculates an optimum engine temperature. The ECM then generates a temperature control signal proportioned to the optimum engine temperature. The control signal informs the controller regarding the optimum designed engine temperature. The plurality of sensors detect, for example, coolant flow, coolant fluid temperature, engine temperature, mass air flow, throttle position, the RPM of the engine, etc. The controller provides an output signal to the electronic thermostat of the present invention to open and close the thermostat valve electronically and permit coolant flow to the radiator, thereby maintaining the temperature of the engine at substantially the optimum temperature calculated by the ECM. In other words, the electronically controlled cooling system of the present invention is capable at analyzing the current state of the engine using the sensor signals and then controlling how much coolant flow to send to or from the radiator to optimize engine temperature.

The apparatus of the present invention advantageously provides a more rapid control of coolant temperature than conventional passive systems. By using an electrical signal to heat the wax inside the thermostat, expansion of the wax and opening of the valve can occur very rapidly, preferably within about one second. Advantageously, the electronic controller can hold the thermostat valve partially open to control the amount of fluid permitted to flow to the radiator.

The present invention not only permits more accurate and rapid temperature control, but also advantageously permits the engine temperature to be set and controlled at a plurality of different levels depending on operating conditions of the engine. This feature advantageously improves fuel economy, reduces exhaust emissions, and improves overall engine performance.

According to one aspect of the present invention, an apparatus is provided for controlling the temperature of an engine based on a temperature control signal generated by an electronic control module of the engine. The electronic control module is coupled to a plurality of sensors configured to detect a plurality of engine component parameters and is configured to generate the temperature control signal related to an optimum engine temperature calculated using at least one output signal from at least one of the plurality of sensors. The apparatus includes a controller coupled to the electronic control module and to an engine temperature sensor. The controller generates an output signal based on the temperature control signal received from the electronic control module and on a signal proportional to the actual engine temperature received from the engine temperature sensor. The apparatus also includes an electronically actuated thermostat including a valve located within a coolant flow passageway of the engine and a motor electrically coupled to the controller. The motor is configured to open and close the valve to control flow of a coolant fluid in the coolant flow passageway in response to the output signal from the controller.

In the illustrated embodiment, the motor includes a housing filled with a temperature responsive expansion agent, and a heater located inside the housing. The heater is electrically coupled to the controller. The motor also includes a movable piston having an end located in the housing. The piston is movable from a retracted position to an extended position to open and close the valve as the heater heats the expansion agent in response to the output signal from the controller.

Also in the illustrated embodiment, the motor is also located in the coolant flow passageway of the engine adjacent the valve so that an increase in the temperature of the coolant fluid above a predetermined level causes expansion of the expansion agent in the housing to open the valve. This provides a fail safe feature to reduce the likelihood of an overheat condition should any of the electronic components fail.

The motor includes a first conductive member located on a first side of the heater and a second conductive member located on a second side of the heater. The first conductive member is electrically coupled to the controller and the second conductive member being grounded. In the illustrated embodiment, the motor includes an inner conductive sleeve and an outer conductive sleeve. The heater has a generally cylindrical body located between the inner and outer conductive sleeves, and the controller is electrically coupled to one of the inner and outer conductive sleeves.

According to another aspect of the present invention, an apparatus is provided for setting the temperature of an engine to a predetermined temperature to optimize performance of the engine. The apparatus includes a controller coupled to an engine temperature sensor. The controller generates an output signal related to the predetermined temperature and to a signal proportional to the actual engine temperature received from the engine temperature sensor. The apparatus also includes an electronically actuated thermostat having a valve located within a coolant flow passageway of the engine and a motor. The motor includes a housing filled with a temperature responsive expansion agent, and a heater located inside the housing. The heater is electrically coupled to the controller. The motor also includes a movable piston having an end located in the housing. The piston is movable from a retracted position to an extended position to open and close the valve as the heater heats the expansion agent in response to the output signal from the controller to maintain engine temperature at substantially the predetermined temperature.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWING

Figure 1:
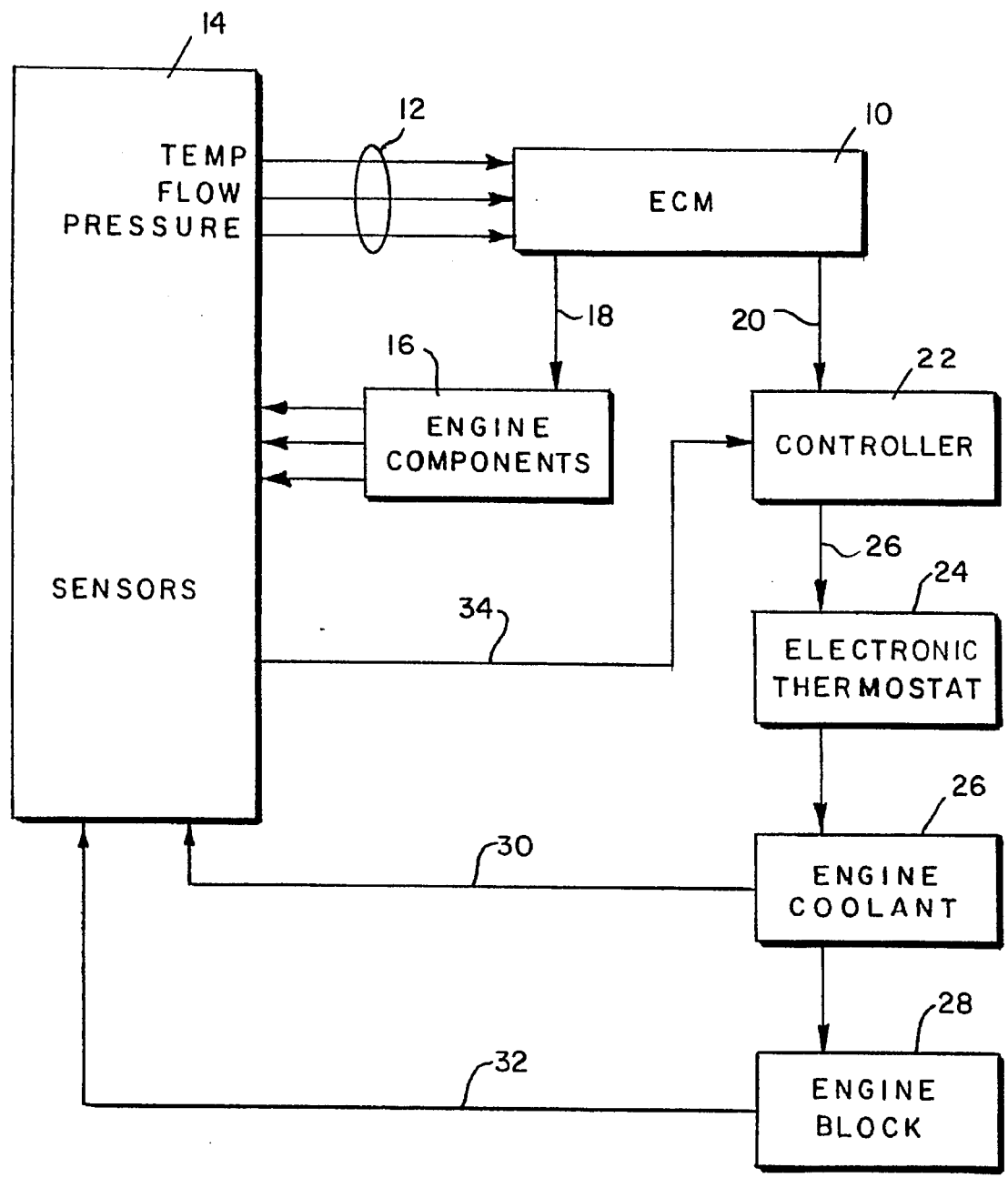
FIG. 1 is a block diagram illustrating an electronically controlled engine cooling system of the present invention.

Referring now to the drawings, FIG. 1 illustrates a block diagram of the electronically controlled cooling system of the present invention. The present invention provides a closed loop feedback system which utilizes a conventional electronic control module (ECM) 10 to provide an active control for coolant fluid flow within the engine. The ECM 10 is supplied with a plurality of input signals illustrated on lines 12 from a plurality of sensors 14. Sensors 14 detect various parameters of engine components 16. Engine components 16 include electrical, fuel, air, exhaust and mechanical components. Sensors 14 can detect, for example, coolant fluid temperature, flow, pressure or other variables. Sensors 14 also illustratively detect exhaust oxygen content, mass air flow to the engine, throttle position, RPM of the engine, vehicle speed, ESC knock, manifold air temperature, A/C pressure switch, and EGR diagnostic temperature switch. The ECM 10 provides control signals to engine components 16 based on the input signals 12 from sensors 14 as illustrated by line 18. Therefore, the ECM 10, sensors 14, and engine components 16 create a closed loop feedback system for controlling engine operation.

An engine's temperature is one of the major factors related to fuel economy, exhaust emission, and overall engine performance. However, engine temperature is not included in conventional ECM controls. The present invention provides an apparatus for utilizing an output signal from the ECM 10 to control the engine cooling system electronically. Specifically, the ECM 10 uses input signals 12 related to coolant flow, coolant temperature, engine temperature, mass air flow, throttle position, RPM, etc. to calculate an optimum temperature for the engine. ECM 10 then generates a temperature control signal proportional to the calculated optimum temperature.

The temperature control signal from ECM 10 is supplied to a smart controller 22 by electrical coupling line 20. The controller 22 is electrically coupled to an electronic thermostat 24 by line 26. The controller 22 provides electronic impulses or signals to thermostat 24 to control coolant fluid flow to the radiator and thereby change the temperature of the engine. Therefore, thermostat 24 controls engine coolant flow and coolant fluid temperature as illustrated at block 26. Coolant fluid flow and temperature, in turn, control the temperature of the engine block illustrated at 28. Sensors 14 monitor coolant temperature as illustrated at line 30 and the engine block temperature as illustrated by line 32. It is understood that a plurality of temperature sensors are positioned at various locations in the engine. An output signal from temperature sensors 14 is coupled directly to controller 22 as illustrated by line 34. The temperature sensor output is also supplied to ECM 10 in a conventional manner. Therefore, electronic sensors placed in the coolant flow 26 and engine block 28 provide feedback to both controller 22 and ECM 10.

Controller 22 is set to maintain the engine temperature at substantially an optimum temperature calculated by ECM 10. For instance, ECM 10 may provide an output signal 20 to controller 22 indicating that the controller should maintain the engine temperature at 180°. Therefore, controller 22 provides an output signal 26 to thermostat 24 to control movement of the thermostat valve and maintain the temperature at substantially 180°. Controller 22 compares the feedback signal 34 proportional to the actual engine temperature to the optimum temperature signal received on line 20 and adjusts the position of the valve of electronic thermostat 24 to maintain the actual engine temperature on line 34 at substantially the optimum temperature on line 20.

If parameters of engine components 16 change, the ECM 10 can calculate a new optimum temperature for the engine and set the controller 22 to adjust the engine temperature automatically to the new optimum temperature. Therefore, the present invention advantageously permits the engine temperature to be set at many different levels based upon operating conditions of the engine or vehicle. A conventional thermostat may only be set to one predetermined temperature.

The electronic controlled coolant apparatus of the present invention advantageously permits ECM 10 and controller 22 to set the engine temperature at any desired level. For instance, when the engine is fully loaded, such as when driving up a hill, ECM 10 may set controller 22 so that the engine runs cooler. For example, the engine temperature could be reduced from 200° F. to 180° F. by ECM 10 when the engine is fully loaded. During engine warm-up, the ECM 10 and controller 22 can increase engine temperature to a higher than normal temperature. When vehicle is on a highway, the ECM 10 and controller 22 may be used to set the engine temperature to a lower temperature than normal.

The electronically controlled cooling apparatus of the present invention can therefore be used to open the valve of the thermostat 24 earlier or later than a conventional thermostat to optimize engine performance. Since the electronically controlled coolant apparatus of the present invention can set a plurality of different temperature levels for the engine, the present invention advantageously improves fuel economy, exhaust emissions, and overall engine performance.

Figure 2:
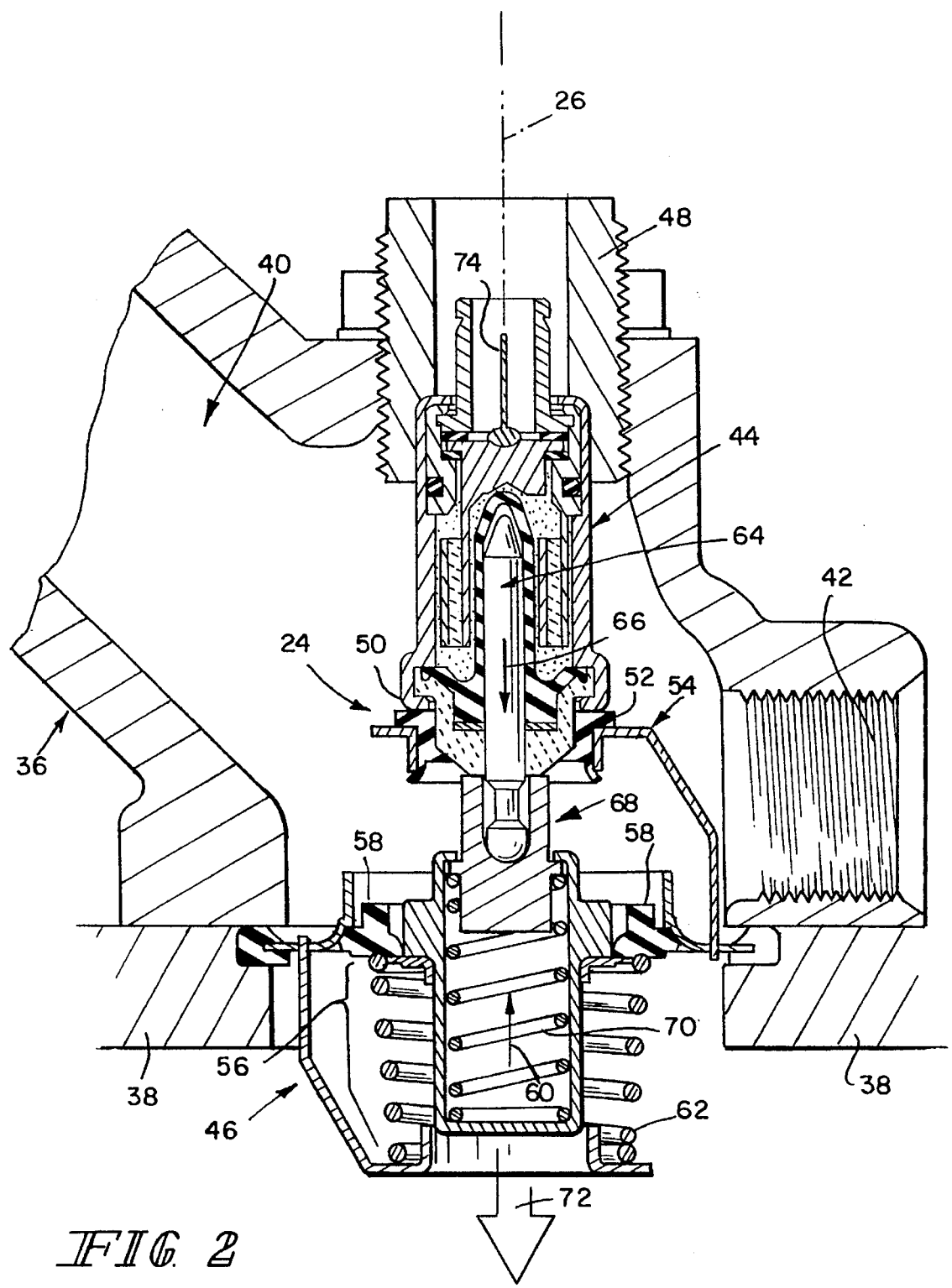
FIG. 2 is a sectional view taken through an engine block and housing illustrating an electronic thermostat of the present invention including a motor and a valve mounted in a main coolant fluid flow passageway of the engine for controlling fluid flow to a radiator.
Figure 3:
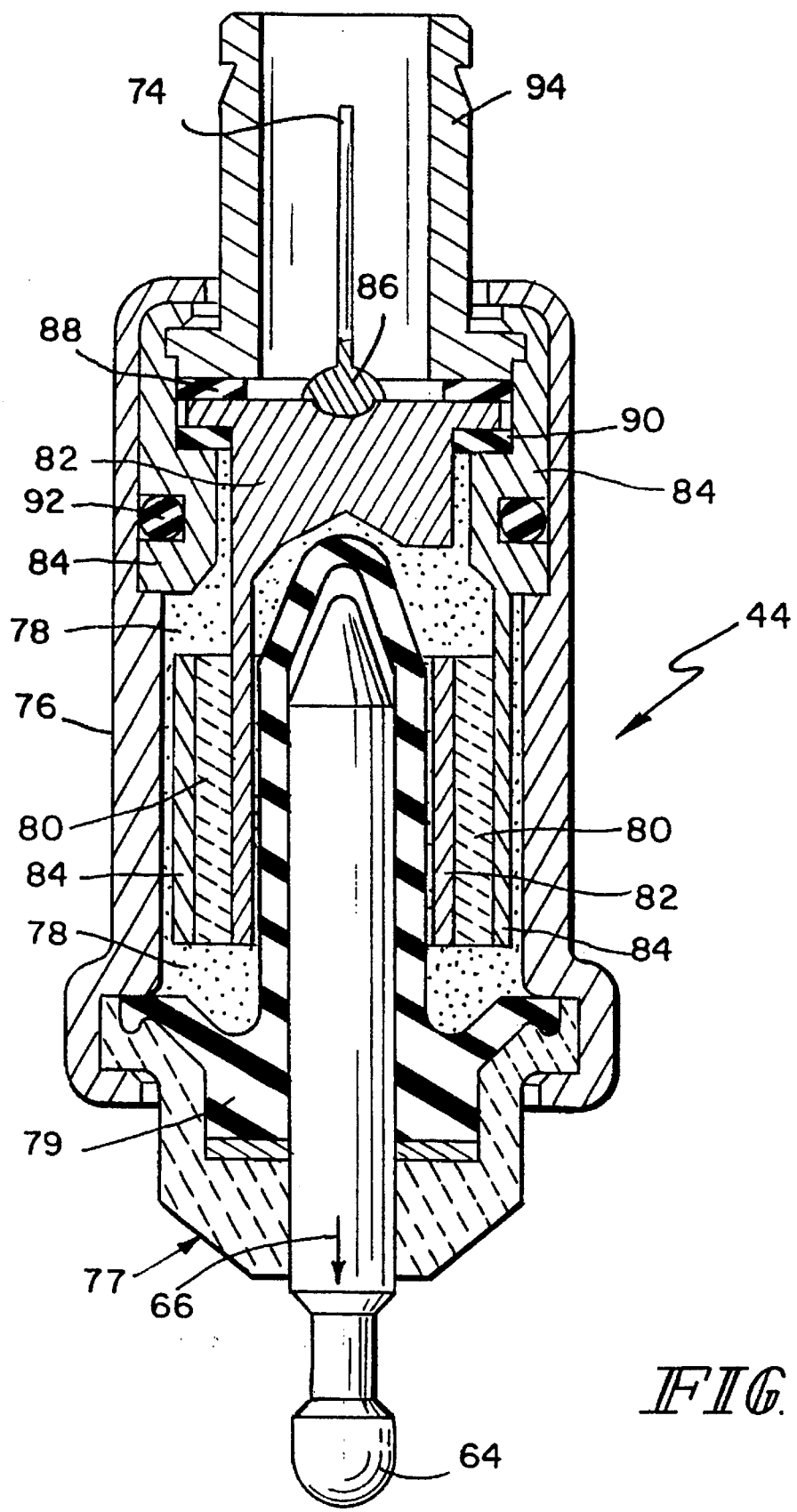
FIG. 3 is an enlarged sectional view illustrating details of the motor of the electronic thermostat.

Details of the electronic thermostat 24 are illustrated in FIGS. 2 and 3. Thermostat 24 is coupled between a housing 36 and engine block 38. Housing 36 includes a main flow passageway 40 and a bypass flow passageway 42. Electronic thermostat 24 includes an electronically heated wax motor 44 and a valve assembly 46. Motor 44 is coupled to housing 36 by threaded coupler 48. Coupler 48 is adjusted until a shoulder 50 of motor 44 engages a support ring 52 coupled to a frame 54 of valve assembly 46. Valve assembly 46 is mounted between housing 36 and engine block 38 in a conventional manner to control flow of coolant fluid to or from the radiator. Valve assembly 46 includes a stationary annular valve seat 56 and a movable valve member 58. Movable valve member 58 is biased in a normally closed position in the direction of arrow 60 by spring 62. When motor 44 is electronically heated as discussed in detail below, stem or piston 64 moves in the direction of arrow 66 against a stud 68. Stud 68 transfers motion through override spring 70 to move movable valve member 58 downwardly in the direction of arrow 66 to open valve member 58 and permit main flow of the coolant between main flow passageway 40 and the radiator in the direction of arrow 72 or in a reverse direction depending upon the location of the thermostat 24. Stud 68 and spring 70 create a safety override mechanism which is actuated only when the movable valve 58 is fully opened and spring 62 is at its solid length and when piston 64 continues to move in the direction of arrow 66.

Advantageously, motor 44 is located in the coolant fluid flow. Therefore, in the case of a malfunction of the ECM 10, controller 22, or the electrical connection to thermostat 24, rising coolant fluid temperature heats the expansion agent inside the motor 44 and causes piston 64 to stroke in the direction of arrow 66 to open valve 46 and permit coolant fluid flow to radiator in the direction of arrow 72. Therefore, by locating the motor 44 within the coolant fluid flow, the electronic thermostat 24 of the present invention provides a fail safe mechanism to reduce the likelihood of an overheat condition. An electrical lead 74 for coupling controller 22 to thermostat 24 is located outside housing 36. By providing the electrical connection outside of the coolant fluid, the apparatus of the present invention reduces the likelihood of any electrolysis or damage of the electronic components due to coolant fluid flow.

In another embodiment, the valve of thermostat 24 is a normally open valve which requires an electrical signal supplied to motor 44 to close the valve. Therefore, if one of the electrical components fails, and the signal is removed from motor 44, the valve will automatically move to its open position.

Further details of the motor 44 are illustrated in FIG. 3. Motor 44 includes a housing 76 filled with an expansion agent such as wax in region 78. Motor 44 also includes a cover 77 and a viton sleeve 79. The viton sleeve 79 transforms pressure from the expanding wax 78 into radial and axial forces to move the piston 64. Heating of wax 78 causes melting and expansion of the wax to drive piston 64 outwardly in the direction of arrow 66. Heating of wax 78 is provided by a heater 80. Preferably, heater 80 is a positive temperature coefficient (PTC) ceramic heater. Heater 80 illustratively includes a cylindrical body located between an inner conductive cylindrical sleeve 82 and an outer conductive cylindrical sleeve 84. Preferably, sleeves 82 and 84 are made from brass. Sleeves 82 and 84 provide a mechanical reinforcement and electrical leads on opposite sides of heater 80 to provide current flow through the ceramic heater 80. Lead 74 is coupled to inner brass sleeve 82 by suitable electrically conductive soldering material 86. Annular insulators and seals 88 and 90 are provided to isolate electrically the inner and outer sleeves 82 and 84. An 0-ring seal 92 is provided to prevent leakage of wax 78.

An outer cylindrical receptacle 94 surrounds lead 74. Body 94 is configured to receive a conventional electrical connector plug to couple controller 22 to motor 44. The output signal from controller 22 is coupled to lead 74. Illustratively, the output signal from controller 22 is a +12 V DC signal. Power requirements to heater 80 depend on the size of motor 44. Therefore, current passes through lead 74, through inner conductive sleeve 82, through heater 80, and through outer conductive sleeve 84 to ground which is provided by body 94, housing 76, and coupler 48 connected to housing 36. Current flow through heater 80 causes the heater 80 to heat the wax 78 and force piston 64 outwardly in the direction of arrow 66 to open valve 46. As discussed above, the output signal 26 from controller 22 may be controlled electrical pulses to partially open valve 46. Therefore, the electronic thermostat 24 is capable of maintaining engine temperature at any desired temperature within maximum and minimum temperature levels.

Although the invention has been described in detail with reference to a certain preferred embodiment, variations and modifications exist within the scope and spirit of the present invention as described and defined in the following claims.

What is claimed is:

1. An apparatus for controlling the temperature of an engine based on a temperature control signal generated by an electronic control module of the engine, the electronic control module being coupled to a plurality of sensors configured to detect a plurality of engine component parameters and being configured to generate the temperature control signal related to an optimum engine temperature calculated using at least one output signal from at least one of the plurality of sensors, the apparatus comprising:

a controller coupled to the electronic control module and to an engine temperature sensor, the controller generating an output signal based on the temperature control signal received from the electronic control module and on a signal proportional to the actual engine temperature received from the engine temperature sensor; and an electronically actuated thermostat including a valve located within a coolant flow passageway of the engine and a motor electrically coupled to the controller, the motor including a housing filled with a temperature responsive expansion agent, an inner conductive sleeve, an outer conductive sleeve, and a heater having a generally cylindrical body located between the inner and outer conductive sleeves, the controller being electrically coupled to one of the inner and outer conductive sleeves, the motor also including a movable piston having an end located in the housing, the piston being movable between a retracted position and an extended position to adjust the valve as the heater heats the expansion agent to control flow of a coolant fluid in the coolant flow passageway in response to the output signal from the controller.

2. The apparatus of claim 1, wherein the expansion agent is a wax material.

3. The apparatus of claim 1, wherein the motor is also located in the coolant flow passageway of the engine adjacent the valve so that an increase in the temperature of the coolant fluid above a predetermined level causes expansion of the expansion agent in the housing to open the valve.

4. The apparatus of claim 1, wherein the inner and outer conductive sleeves are made of brass.

5. The apparatus of claim 1, wherein the heater is a ceramic heater.

6. The apparatus of claim 1, wherein the heater is a positive temperature coefficient ceramic heater.

7. An apparatus for actively controlling the temperature of an engine to a variable optimum temperature to optimize performance of the engine, the apparatus comprising:

a controller coupled to an engine temperature sensor, the controller generating an output signal related to the variable optimum temperature and to a signal proportional to the actual engine temperature received from the engine temperature sensor; and an electronically actuated thermostat including a valve located within a coolant flow passageway of the engine, a motor, the motor, and a heater located inside the housing, the motor including a housing filled with a temperature responsive expansion agent, and a movable piston having an end located in the housing, the piston being movable from a retracted position to an extended position to adjust the valve as the heater heats the expansion agent in response to the output signal from the controller the motor also including a first conductive member located on a first side of the heater and a second conductive member located on a second side of the heater, the first conductive member being electrically coupled to the controller and the second conductive member being heater, the first conductive member being electrically coupled to the controller and the second conductive member being heater, the first conductive member being electrically coupled to the controller and the second conductive member being grounded through the housing of the motor to heat the heater in response to the output signal from the controller.

8. The apparatus of claim 7, wherein the expansion agent is a wax material.

9. The apparatus of claim 7, wherein the motor is also located in the coolant flow passageway of the engine adjacent the valve so that an increase in the temperature of the coolant fluid above a predetermined level causes expansion of the expansion agent in the housing to open the valve.

10. The apparatus of claim 7, wherein the first conductive member is an inner conductive sleeve and the second conductive member is an outer cylindrical sleeve, the heater having a generally cylindrical body located between the inner and outer conductive sleeves, the controller being electrically coupled to one of the inner and outer conductive sleeves.

11. The apparatus of claim 10, wherein the inner and outer conductive sleeves are made of brass.

12. The apparatus of claim 7, wherein the valve is a normally closed valve.

13. The apparatus of claim 7, wherein the heater is a positive temperature coefficient ceramic heater.

14. An apparatus for controlling the temperature of an engine based on a temperature control signal generated by an electronic control module of the engine, the electronic control module being coupled to a plurality of sensors configured to detect a plurality of engine component parameters and being configured to generate the temperature control signal related to an optimum engine temperature calculated using at least one output signal from at least one of the plurality of sensors, the apparatus comprising:

a controller coupled to the electronic control module and to an engine temperature sensor, the controller generating an output signal based on the temperature control signal received from the electronic control module and on a signal proportional to the actual engine temperature received from the engine temperature sensor; and an electronically actuated thermostat including a valve located within a coolant flow passageway of the engine and a motor, the motor including a housing filled with a temperature responsive expansion agent, an inner conductive sleeve located in the housing, an outer cylindrical sleeve located in the housing spaced apart from the inner conductive sleeve, a heater having a generally cylindrical body located between the inner and outer conductive sleeves, and a movable piston having an end located in the housing, the piston being movable from a retracted position to an extended position to open and close the valve, and wherein the controller is electrically coupled to one of the inner and outer conductive sleeves to cause the heater to heat the expansion agent selectively in response to the output signal from the controller to maintain engine temperature at substantially the predetermined temperature.

15. The apparatus of claim 14, wherein the heater is a positive temperature coefficient ceramic heater.

16. The apparatus of claim 14, wherein the motor is also located in the coolant flow passageway of the engine adjacent the valve so that an increase in the temperature of the coolant fluid above a predetermined level causes expansion of the expansion agent in the housing to open the valve.

17. An electronically actuated thermostat apparatus for controlling the temperature of an engine based on an electrical control signal from a controller, the apparatus comprising a valve configured to be positioned within a coolant flow passageway of the engine, a housing filled with a temperature responsive expansion agent, a heater located within the housing, a first conductive member located on a first side of the heater, the first conductive member being coupled to the controller for receiving the electrical control signal, a second conductive member located on a second side of the heater, the second conductive control member being grounded through the housing, a movable piston having an end located in the housing, the piston being movable from a retracted position to an extended position to open and close the valve, and a lead for electrically coupling the controller to one of the inner and outer conductive sleeves to cause the heater to heat the expansion agent selectively in response to the electrical signal from the controller.

18. The apparatus of claim 17, wherein the first conductive member is an inner conductive sleeve located in the housing, the second conductive member is an outer conductive sleeve located in the housing spaced apart from the inner conductive sleeve, and the heater has a generally cylindrically shaped body located between the inner and outer conductive sleeves.

19. The apparatus of claim 17, wherein the housing is also located in the coolant flow passageway of the engine adjacent the valve so that an increase in the temperature of the coolant fluid above a predetermined level causes expansion of the expansion agent in the housing to open the valve.

* * * * *